United States Patent [19]

Burger et al.

[11] 4,377,172

[45] Mar. 22, 1983

[54] APPARATUS FOR TRANSPORTING FILTER ROD SECTIONS OR THE LIKE

[75] Inventors: Jürgen Burger, Marschacht; Alois Kasparek, Hamburg, both of Fed. Rep. of Germany

[73] Assignee: Hauni-Werke Körber & Co. KG., Hamburg, Fed. Rep. of Germany

[21] Appl. No.: 237,752

[22] Filed: Feb. 24, 1981

[30] Foreign Application Priority Data

Feb. 25, 1980 [DE] Fed. Rep. of Germany ....... 3006947

[51] Int. Cl.³ .............................. A24C 5/32; A24C 5/35
[52] U.S. Cl. ..................................... 131/282; 131/283
[58] Field of Search .................... 406/1.9, 31; 131/280, 131/282, 283, 910, 909, 908, 907, 906, 905, 904

[56] References Cited

U.S. PATENT DOCUMENTS 3,789,744 2/1974 Wahle .................................. 131/909
4,157,796 6/1979 Warman ................................ 406/31

Primary Examiner—V. Millin
Attorney, Agent, or Firm—Kontler, Grimes & Battersby

[57] ABSTRACT

Apparatus which transports filter rod sections from a maker to a processing machine has a pneumatic sender which admits a file of sections into the inlet of a pneumatic conveyor whose outlet delivers sections to a receiver wherein the file of sections is converted into a row which is admitted into the magazine of the processing machine. A first photoelectronic detector monitors the travel of sections at the inlet of the conveyor and a second photoelectronic detector monitors the sections in the region of an accelerating device forming part of the receiver and serving to separate successive sections of the file from each other. The transducers of the detectors are connected with an evaluating circuit having several logic circuits one of which generates defect signals in response to detection of absence of delivery of sections from the sender into the conveyor, another of which generates defect signals in the absence of proper delivery of sections into the receiver, a third of which compares the numbers of impulses transmitted by the two detectors and generates a defect signal when the result of comparison indicates the presence of a pileup of sections in the outlet of the conveyor, and a fourth of which activates a pneumatic ejector if the width of gaps between successive sections downstream of the accelerating device is insufficient. The fourth logic circuit further serves to arrest the receiver when the spacing between the sections downstream of the accelerating device is insufficient to convert the file into a row, and to arrest the sender when the spacing between successive sections downstream of the accelerating device equals or approaches zero.

24 Claims, 5 Drawing Figures

APPARATUS FOR TRANSPORTING FILTER ROD SECTIONS OR THE LIKE

BACKGROUND OF THE INVENTION

The present invention relates to apparatus for transporting rod-shaped articles which constitute or form part of smokers' products, and more particularly to improvements in apparatus for pneumatically transporting filter rod sections or analogous rod-shaped articles between producing and processing machines.

It is already known to transport filter rod sections from a maker (e.g., a filter rod making machine which produces and delivers a file of discrete filter rod sections of multiple unit length) to one or more consuming or processing machines by resorting to pneumatic conveyors. Such transporting apparatus normally comprise a pneumatic sender which receives rod-shaped articles from the maker and introduces successive articles into the inlet of a pneumatic conveyor. The latter advances the file of successive articles to a receiver which, in turn, admits the articles into the magazine of a processing machine, e.g., into the magazine of a filter tipping machine wherein filter rod sections are united with plain cigarettes to form filter cigarettes of unit length or multiple unit length. As a rule, the receiver comprises a speed uniformizing device which delivers successive articles issuing from the pneumatic conveyor to an accelerating device so that successive articles of the file develop gaps which allow for conversion of the file into one or more rows wherein the articles travel sideways (i.e., transversely of their axes) and are fed into the magazine of the processing machine. Apparatus of the just outlined character are especially suited for transport of filter rod sections through considerable distances, e.g., from a battery of makers which are installed in one part of the manufacturing plant to a battery of processing machines which are grouped in another part of the same plant. It is also known to install a reservoir system between the maker and the corresponding sender or senders so as to ensure that eventual fluctuations in the rate at which a maker delivers rod-shaped articles and/or in the rate at which the sender is to deliver articles to a processing machine can be compensated for by increasing or reducing the supply of articles in the reservoir system. Suitable monitoring devices (e.g., photocells) can be installed in the pneumatic conveyor of each transporting apparatus in order to ascertain the presence or absence of rod-shaped articles in the pipeline.

German Offenlegungsschrift No. 1,432,688 discloses a pneumatic transporting apparatus wherein a sender delivers filter rod sections into the inlet of a pneumatic conveyor and the latter delivers the filter rod sections to the processing machine. In order to ensure that an adequate supply of articles is always present upstream of the processing machine, and to further ensure that clogging of the pneumatic conveyor is detected without appreciable delay, the apparatus which is disclosed in this German publication comprises two photocells which are adjacent to the path of travel of filter rod sections in the pneumatic conveyor and are disposed one after the other. Signals which are generated by such photocells are used to regulate the admission of filter rod sections into the pneumatic conveyor.

German Offenlegungsschrift No. 1,532,253 discloses an apparatus which delivers filter rod sections to a filter tipping machine. The apparatus comprises a sender, a receiver which is connected with the magazine of the filter tipping machine, and a pneumatic conveyor connecting the outlet of the sender with the inlet of the receiver. The path which is defined by the pneumatic conveyor is monitored by two photocells which are installed one after the other and serve the dual purpose of regulating the admission of filter rod sections into the pneumatic conveyor as well as of detecting eventual pileups of articles in the pipeline.

A serious drawback of the above described conventional transporting apparatus is that the monitoring devices which are adjacent to the pneumatic conveyor can detect the existence of defects and/or malfunctions only after the fact, i.e., relatively soon or with a certain delay after the occurrence of a malfunction. For example, if the monitoring devices are designed to scan the path which is defined by the pneumatic conveyor for the presence or absence of a pileup, the detection of a pileup will take place with a certain delay after the development of malfunction or malfunctions which have initiated the pileup in the pneumatic conveyor. In other words, conventional monitoring devices are incapable of detecting eventual malfunctions as soon as they occur, and they are evidently incapable of detecting the development of potential causes of malfunctions so as to enable an attendant to eliminate such potential causes of malfunctions before they can adversely influence the output of the processing machine, totally clog the pneumatic conveyor and/or cause the production of a large number of defective rod-shaped articles.

OBJECTS AND SUMMARY OF THE INVENTION

An object of the invention is to provide a novel and improved apparatus which can transport filter rod sections or other rod-shaped articles constituting or forming part of smokers' products between one or more producing machines and one or more processing or consuming machines in such a way that the number of down times and the duration of each down time can be reduced to a fraction of those in heretofore known transporting apparatus.

Another object of the invention is to provide the apparatus with novel and improved means for monitoring the operation of various components and with novel and improved means for evaluating the results of the monitoring operation with a view to detect the defects as well as the causes of defects with a minimum of delay.

A further object of the invention is to provide the apparatus with an evaluating device which can ascertain potential causes of defects before the defects actually occur and which can pinpoint the causes and the locations of defects to allow for rapid elimination thereof.

An additional object of the invention is to provide novel and improved means for detecting and pinpointing defects or potential defects in the pneumatic conveyor as well as at both ends of the conveyor.

Another object of the invention is to provide a monitoring system which exhibits the aforediscussed features and advantages and can be incorporated in existing transporting apparatus for filter rod sections or other types of rod-shaped articles which constitute or form part of smokers' products.

A further object of the invention is to provide a versatile monitoring system which allows for numerous adjustments so as to best serve a particular consuming and/or a particular transporting apparatus for filter rod sections or the like.

Another object of the invention is to provide a monitoring system which can automatically warn the attendants in the event of actual or potential malfunctions in the transporting apparatus.

The invention is embodied in an apparatus for transporting rod-shaped articles which constitute or form part of smokers' products, especially for transporting filter rod sections of multiple unit length from a maker or a reservoir system to a filter tipping machine. The apparatus comprises a pneumatic conveyor having an inlet and an outlet, a pneumatic sender which is operable to deliver a file of rod-shaped articles into the inlet of the pneumatic conveyor (the sender can receive or draw articles from its own magazine, from a reservoir system or directly from a maker of filter rod sections or the like), a receiver which is adjacent to the outlet and is operable to accept successive articles from the conveyor (the receiver preferably comprises a speed uniformizing device for successive articles leaving the outlet, an accelerating device which follows the speed uniformizing device and is designed to establish between successive articles gaps of predetermined width, and a feeding device which converts the file of articles into one or more rows and preferably forcibly introduces the row or rows of articles into the magazine of the filter tipping or another processing machine), a monitoring device adjacent to the sender and including means (e.g., a photoelectronic transducer) for generating a first series of impulses in response to travel of successive articles in the conveyor so that such series of impulses is indicative of the presence, absence and rate of delivery of articles from the sender into the inlet of the conveyor, and means evaluating the first series of impulses. The evaluating means comprises signal generating means which is activatable to transmit signals in the absence and/or on deviation of the first series of impulses from a predetermined sequence. The evaluating means preferably includes an electronic circuit and the signals include defect signals and/or signals which can be used to eliminate causes of malfunctions.

In accordance with a first feature of the invention, the evaluating means further includes a first unit (preferably a first logic circuit) having means for ascertaining the presence or absence of impulses as well as the duration of each impulse in the operative condition of the sender (i.e., while the sender is supposed to deliver articles into the inlet of the pneumatic conveyor) and for activating the signal generating means (e.g., to furnish a visible and/or audible signal) when the duration of an impulse deviates from a predetermined value (this includes or can include the absence of impulses, the generation of impulses of excessive duration and the generation of impulses which are too short). The ascertaining means of the first unit preferably includes a resettable timer in the logic circuit. The monitoring device is preferably a detector of the type which generates the first series of impulses in the absence of articles in the adjacent portion of the pneumatic conveyor so that each of the impulses is indicative of the width of the gap between successive articles which the sender admits into the inlet of the pneumatic conveyor.

In accordance with a second feature of the invention, the receiver includes an accelerating device for successive articles leaving the outlet of the pneumatic conveyor and the apparatus further comprises a second monitoring device which is adjacent to the upstream or downstream side of the accelerating device (i.e., to that side which is nearer to or more distant from the outlet of the pneumatic conveyor) and includes means (e.g., a photoelectronic transducer) for generating a second series of impulses in response to travel of successive articles through the receiver so that the second series of impulses is indicative of the presence, absence and rate of travel of articles through the receiver. The evaluating means is connected with the second monitoring device and the signal generating means of the evaluating means is activatable to transmit signals in the absence and/or on deviation of the second series of impulses from a predetermined sequence. The evaluating means preferably comprises a second unit (e.g., a second logic circuit) having means for ascertaining the presence or absence of impulses of the second series as well as the duration of each impulse of the second series in the operative condition of the sender and for activating the signal generating means of the evaluating means in the absence of an impulse of the second series as well as when the duration of an impulse of the second series deviates from a predetermined value. The ascertaining means of the second unit can comprise a resettable timer in the respective logic circuit. The second monitoring device can be disposed between the aforediscussed speed uniformizing device and the accelerating device of the receiver or downstream of the accelerating device.

The ascertaining means (i.e., a timer or the like) of the first unit in the evaluating means preferably includes means for transmitting to the second unit of the evaluating means (i.e., to that unit which receives the impulses of the second series) a signal in response to activation of the signal generating means by way of the first unit. The ascertaining means of the second unit is preferably operable to activate the signal generating means only in the absence of a signal from the ascertaining means of the first unit. This ensures that the generation of signals as a result of evaluation of the first series of impulses does not overlap with the generation of signals in response to evaluation of signals of the second series. Moreover, and since the signal generating means can comprise several indicating devices in the form of lamps or the like which light up or react otherwise in response to generation of signals on initiative from the first or second unit, the generation of each signal can indicate to the attendant or attendants the possible or actual cause of malfunction or defect. Such indication would be less accurate if the evaluation of impulses of the second series could lead to the generation of defect signals at the time when the evaluation of the first series of impulses has already resulted in the generation of one or more defect signals.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
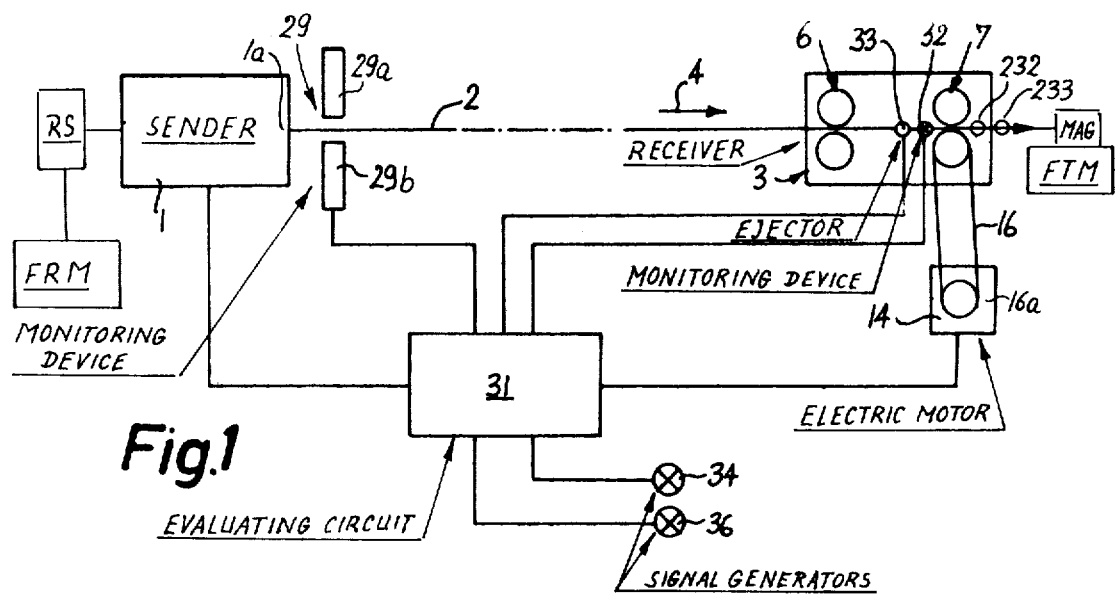
FIG. 1 is a schematic representation of a transporting apparatus which embodies one form of the invention and is designed to deliver filter rod sections from a maker to a filter tipping machine.

FIG. 1 illustrates that portion of a pneumatic transporting apparatus for filter rod sections 28 (see FIG. 2) which embodies the invention. The apparatus comprises a sender 1 which propels a single file of successive filter rod sections 28 into a pneumatic conveyor 2, and the latter delivers successive filter rod sections to a receiver 3 serving to convert the single file of sections which arrive via conveyor 2 into at least one row wherein the sections 28 move sideways and enter the magazine MAG of a filter tipping or other processing machine FTM. The direction in which the conveyor 2 transports the single file of rod-shaped articles 28 is indicated by the arrow 4. The receiver 3 comprises a speed uniformizing device 6 which receives successive sections 28 from the discharge end of the conveyor 2 and serves to ensure that each section 28 which advances therebeyond travels at a predetermined speed. Successive sections 28 whose speed has been uniformized (either increased or reduced, depending on the speed of sections in the pneumatic conveyor 2) enter an accelerating device 7 which increases the speed of successive sections 28 so that a gap G (FIG. 2) develops between each preceding and the next-following section. The width of each gap G suffices to allow for unobstructed conversion of the direction of movement of successive sections 28 from axial (lengthwise) to transverse (sidewise).

The sender 1 can receive filter rod sections from a filter rod making machine FRM, e.g., a machine known as KDF which is manufactured by the assignee of the present invention. A reservoir system RS (e.g., a system known as RESY which is manufactured by the assignee of the present application) can be interposed between the filter rod making machine FRM and the sender 1 to ensure that the output of the maker FRM need not always match the requirements of the sender 1, i.e., that the reservoir system RS accepts the surplus when the output of the maker FRM exceeds the requirements of the sender 1 and that the reservoir system furnishes the balance when the requirements of the sender 1 exceed the output of the maker. Reservoir systems which can be used in the apparatus of FIG. 1 are disclosed, for example, in commonly owned copending application Ser. No. 130,392 filed Mar. 14, 1980 by Gerhard Tolasch et al. or in commonly owned copending application Ser. No. 130,391 filed Mar. 14, 1980 by Horst Bäse et al. A sender which can be used in the apparatus of FIG. 1 is disclosed in commonly owned U.S. Pat. No. 3,827,757 granted Aug. 6, 1974 to Bob Heitmann et al. A receiver which can be used in the apparatus of FIG. 1 is disclosed in commonly owned U.S. Pat. No. Re. 28,283 granted Apr. 8, 1975 to Willy Rudszinat.

Figure 2:
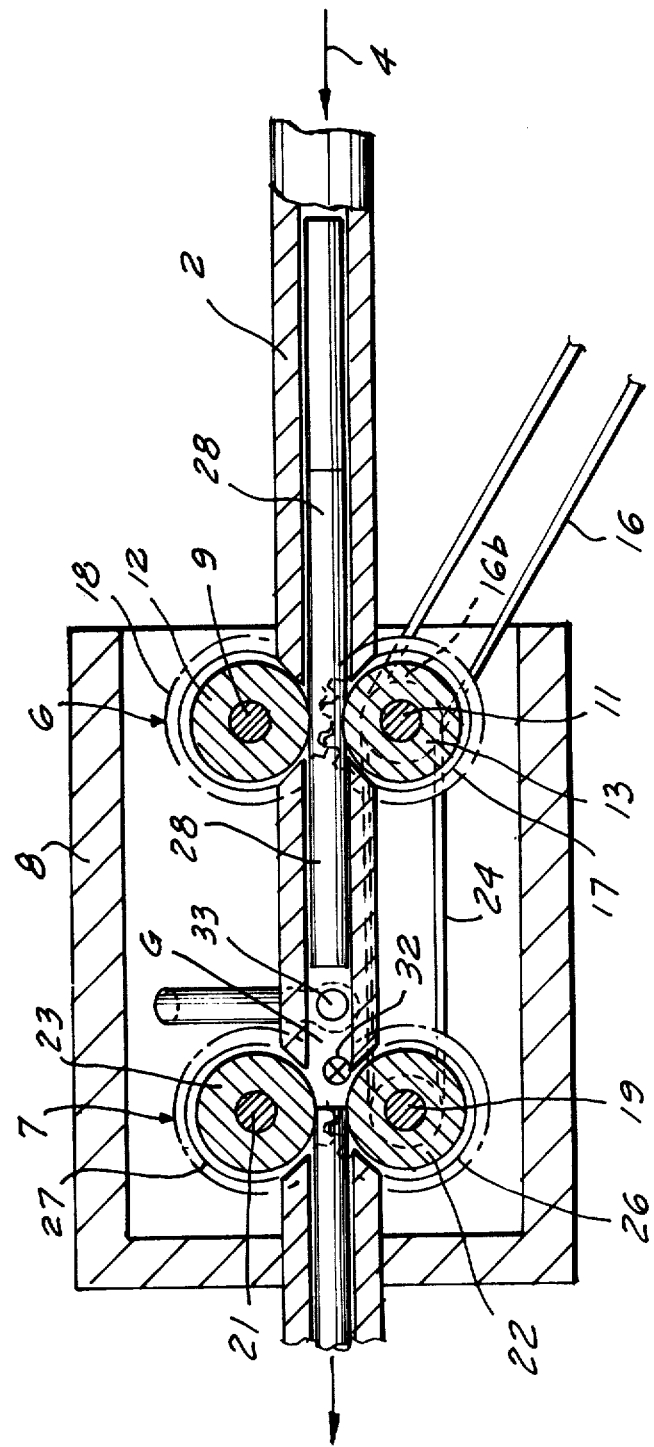
FIG. 2 is an enlarged sectional view of the receiver in the transporting apparatus of FIG. 1.

Certain details of the receiver 3 are illustrated in FIG. 2. The receiving device 6 comprises a housing 8 for two parallel shafts 9 and 11 which extend transversely of the direction (arrow 4) of lengthwise movement of filter rod sections 28 in the pneumatic conveyor 2. The shafts 9 and 11 respectively drive friction wheels 12 and 13 which define a nip having a width at most equal to and preferably slightly less than the diameter of a filter rod section 28. Thus, when a section 28 leaves the discharge end of the pneumatic conveyor 2 and its leader enters the nip of the friction wheels 12 and 13, the speed of the section 28 is necessarily increased or reduced so that it normally matches the peripheral speed of the friction wheels. These friction wheels are driven at the same peripheral speed by two mating gears 18 and 17 which are respectively coaxial with and mounted on the shafts 9 and 11. The shaft 11 is driven by an endless belt 16 which receives motion from a suitable prime mover 14 (see FIG. 1), e.g., a variable-speed electric motor. The belt 16 is trained over a pulley 16a on the output element of the motor 14 and drives a pulley 16b on the shaft 11. The diameters of the gears 17, 18 as well as the diameters of the friction wheels 12, 13, are identical; therefore, the peripheral speed of the friction wheel 12 matches that of the friction wheel 13 and is selected with a view to ensure that the articles 28 at the discharge end of the pneumatic conveyor 2 do not form a pile or stack of excessive length.

The accelerating device 7 is practically identical with the just described speed uniformizing device 6. It is also mounted in the housing 8 and comprises two shafts 19, 21 which are parallel to the shafts 9 and 11. The shafts 19 and 21 respectively carry identical friction wheels 22, 23 and identical gears 26, 27. The peripheral speed of the friction wheel 22 matches that of the friction wheel 23 and is somewhat higher than the peripheral speed of the friction wheel 12 or 13 in the device 6. This is due to the fact that the shaft 19 of the accelerating device 7 is driven by a step-up transmission including a pulley on the shaft 11, an endless belt 24 which is driven by such pulley, and a pulley which is fixedly secured to the shaft 19 and is driven by the belt 24. The belts 16 and 24 can be replaced by endless chains; the aforediscussed pulleys are then replaced by suitable sprocket wheels. It is also possible to replace the illustrated belts 16 and 24 with toothed belts and to utilize toothed pulleys for transmission of motion to as well as for reception of motion from such toothed belts. Since the peripheral speed of the friction wheels 22 and 23 exceeds that of the friction wheels 12 and 13, and since the width of the nip of the wheels 22 and 23 is also slightly less than the diameter of a filter rod section 28, the leader of a filter rod section which enters the accelerating device 7 is engaged by the peripheral surfaces of the friction wheels 22, 23 and the respective filter rod section is moved forwardly and away from the next-following section 28 so as to establish a gap G of requisite width, namely, a gap of such width that each filter rod section 28 which advances beyond the housing 8 of FIG. 2 can be caused to change the direction of its movement from lengthwise to sidewise and to enter the magazine MAG of the filter tipping machine FTM, e.g., a machine of the type disclosed in commonly owned U.S. Pat. No. 4,237,907 granted Dec. 8, 1980 to Pawelko et al.

The mode of operation of the receiver 3 is as follows: Filter rod sections 28 which arrive from the sender 1 via pneumatic conveyor 2 enter the housing 8 to be engaged, seriatim, by the friction wheels 12 and 13 of the speed uniformizing device 6 and to be thereby accelerated or decelerated, depending on the speed of articles 28 in the conveyor 2. Thus, and assuming that the situation is ideal or close to ideal, each and every filter rod section 28 which advances beyond the friction wheels 12 and 13 moves lengthwise at a predetermined speed which matches the peripheral speed of the friction wheels 12 and 13. As a rule, the peripheral speed of friction wheels 12 and 13 is less than the speed of lengthwise movement of sections 28 in the pneumatic conveyor; therefore, the discharge end of the conveyor 2 normally accumulates a file of sections which are disposed end-to-end, i.e., the file of sections 28 awaiting entry into the housing 8 shown in FIG. 2 does not exhibit any spaces or gaps between neighboring sections.

Each filter rod section 28 which advances beyond the speed uniformizing device 6 is engaged by the friction wheels 22, 23 of the accelerating device 7 and is propelled in a direction to the left, as viewed in FIG. 2, so that its trailing end moves away from the leader of the next-following section 28, i.e., the device 7 causes the sections 28 to develop gaps G which are wide enough to allow for entry of successive sections 28 into a feeding device of the type disclosed, for example, in the aforementioned commonly owned U.S. Pat. No. Re. 28,283 to Rudszinat. Reference may also be had to the commonly owned copending application Ser. Nos. 228,966 and 230,417 filed Jan. 27, 1981 and Feb. 2, 1981 by Günter Wahle and Alois Kasparek. These copending applications describe complete receivers of the type suitable for use in the apparatus of the present invention. In fact, the present invention can be readily incorporated in apparatus of the type disclosed by Wahle et al., i.e., each and every filter tipping machine of the apparatus of Wahle et al. may receive filter rod sections from an assembly of a sender, a pneumatic conveyor and a receiver controlled in a manner as described hereinbelow. As regards the mode of converting a single file of accelerated rod-shaped articles into one or more rows of such articles, reference may also be had to commonly owned German Pat. No. 1,815,317.

In accordance with a feature of the present invention, the structure shown in FIG. 1 further comprises a first monitoring device or detector 28 which is disposed in close or immediate proximity of the sender 1 and serves to monitor the travel of filter rod sections 28 in or at the inlet of the pneumatic conveyor 2. In the illustrated embodiment, the monitoring device 29 includes a source 29a of light and a photoelectronic transducer 29b which is located opposite the source 29a and generates an impulse in response to detection or the absence of detection of a filter rod section 28 in that portion of the pneumatic conveyor 2 which extends between the components 29a and 29b of the monitoring device 29. The just mentioned portion of the conveyor 2 must be capable of transmitting radiation which issues from the source 29a. It will be noted that the monitoring device 29 is installed in immediate proximity of the sender 1, i.e., directly at or rather close to the discharge end or outlet 1a of the sender.

Figure 3:
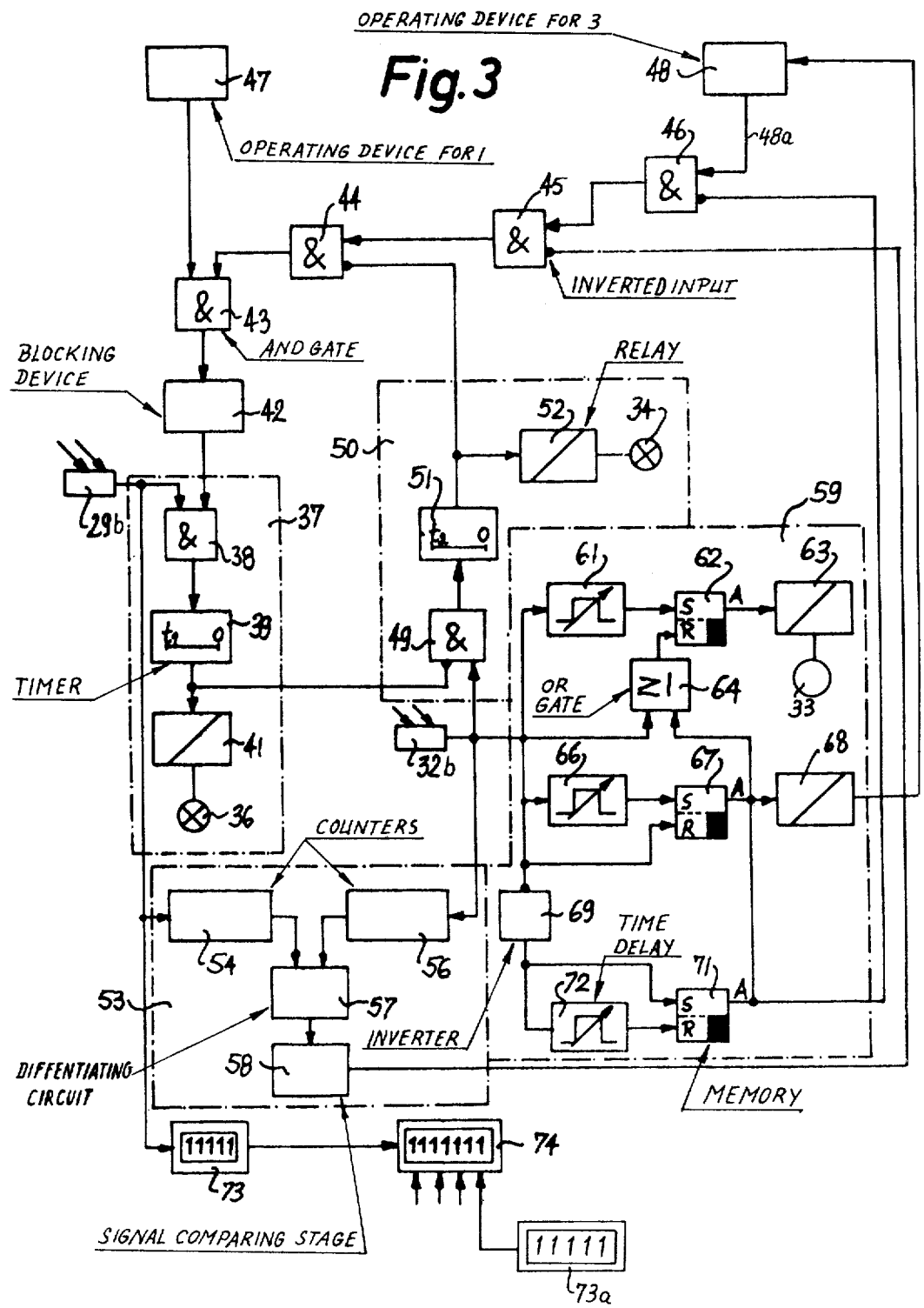
FIG. 3 is a circuit diagram of the signal evaluating means in the apparatus of FIG. 1.

The transducer 29b of the monitoring device 29 transmits impulses to the corresponding input of a novel evaluating circuit 31 the details of which are shown in FIG. 3.

A second monitoring device 32 is installed in or associated with the receiver 3. This monitoring device also comprises a light source (not specifically shown) and a photoelectronic transducer 32b (note FIG. 3). Such parts of the monitoring device 32 are located opposite each other and at the opposite sides of the path of movement of successive filter rod sections 28 from the speed uniformizing device 6 toward the accelerating device 7. This can be seen in FIG. 1 as well as in FIG. 2. The monitoring device 32 can ascertain the presence or absence of filter rod sections 28 in the corresponding portion of the path within the housing 8, and its transducer 32b transmits impulses to the corresponding input of the evaluating circuit 31.

If desired, the second monitoring device 32 can be installed downstream of the accelerating device 7, e.g., at the location which is indicated by the circle 232. In other words, the monitoring device 32 can be located at that side of the accelerating device 7 which faces toward or at that side of the device 7 which faces away from the device 6 and the outlet of the conveyor 2.

An ejecting device 33 is installed in the housing 8 of the receiver 3 intermediate the devices 6 and 7 to expel certain rod-shaped articles 28 in response to appropriate signals from the corresponding output of the evaluating circuit 31. The device 33 preferably comprises a source of compressed gaseous fluid, a conduit which connects the source of gaseous fluid with a nozzle in the region of the path for the filter rod sections 28, and a solenoid-operated valve in the conduit. When the solenoid of the valve receives a signal from the evaluating circuit 31, the nozzle discharges a stream of compressed gas which expels the adjacent rod-shaped article 28 from the corresponding portion of the path. Reference may be had to the commonly owned U.S. Pat. No. 4,154,090 granted May 15, 1979 to Uwe Heitmann et al.; this patent shows a fluid-operated ejecting or expelling device of the type suitable for use in the structure of FIG. 1. If desired, the ejecting device 33 can be installed downstream of the accelerating device 7, for example, at the location indicated by the circle 233.

FIG. 1 further shows two signal generating devices 34 and 36 which light up or generate otherwise detectable "defect" and/or "adjust" signals for the attendants in response to detection of potential or actual defects or malfunctions. The signal generators 34 and 36 are connected with and are actuatable by certain components of the evaluating circuit 31.

The details of the evaluating circuit 31 are illustrated in FIG. 3. This circuit comprises a first unit 37 which is a logic circuit having an AND gate 38 one input of which is connected with the transducer 29b of the monitoring device 29. The AND gate 38 has a second input which is connected with the output of a blocking device 42 in the sender 1 and an output connected with the input of a resettable timer 39. The output of the timer 39 is connected with a relay 41 which can transmit signals to the defect indicating or signal generating device 36. The blocking device 42 may be installed in a hopper or another reservoir of the sender 1 and serves to interrupt the delivery of filter rod sections 28 into the inlet of the pneumatic conveyor 2, for example, in a manner as disclosed in the aforementioned commonly owned U.S. Pat. No. 3,827,757 granted Aug. 6, 1974 to Bob Heitmann et al. Thus, such blocking device can include an elastic member which is actuatable by an electromagnet to move against the adjacent end portions of filter rod sections in the region of the outlet of the aforementioned hopper so as to urge the other end portions of the thus engaged filter rod sections against a stationary wall of the hopper when the electromagnet is deenergized. Energization of the electromagnet entails retraction of the elastic member whereby the hopper is free to admit filter rod sections 28 into the mechanism which shoots the sections into the inlet of the conveyor 2. The means for actuating or activating the blocking device 42 of the sender 1 comprises an AND gate 43 whose output is connected with the input of the blocking device 42 and which has two inputs, one connected to a schematically indicated starting and arresting (operating) device 47 for the sender 1 and the other connected to the output of a further AND gate 44 having an inverted and a non-inverted input. The non-inverted input of the AND gate 44 is connected with the output of a similar AND gate 45 whose non-inverted input is connected with the output of another AND gate 46 having a non-inverted input connected to the output of a starting and arresting (operating) device 48 for the receiver 3.

A second unit or logic circuit 50 of the evaluating circuit 31 has an AND gate 49 one input of which is connected to the transducer 32b of the monitoring device 32. The gate 49 further comprises an inverted input which is connected to the output of the timer 39 in the logic circuit 37 and an output which is connected with the input of a second resettable timer 51 similar to the timer 39. The output of the timer 51 is connected with the inverted input of the AND gate 44 as well as with a relay 52 which can actuate the defect signal generating device 34.

A third unit or logic circuit 53 of the evaluating circuit 31 comprises two counters 54 and 56 whose inputs are respectively connected with the transducers 29b and 32b of the monitoring devices 29, 32 and whose outputs are connected to the corresponding inputs of a differentiating circuit 57. The output of the circuit 57 is connected with the input of a signal comparing stage 58 which further includes a built-in source of reference signals (e.g., an adjustable potentiometer) and transmits a signal to the inverted input of the AND gate 45 when the intensity or another characteristic of the signal at the output of the differentiating circuit 57 deviates from the corresponding characteristic of the reference signal.

A fourth unit or logic circuit 59 of the evaluating circuit 31 comprises three sections or branches. The first branch includes a blocking or time delay device 61 whose output is connected with the setting input S of a memory 62. The output A of the memory 62 is connected with a relay 63. It will be noted that the components 61, 62 and 63 of the first branch of the logic circuit 59 are connected in series. The resetting input R of the memory 62 is connected with the output of an OR gate 64 having two inputs one of which is connected to the transducer 32b of the monitoring device 32.

The second branch of the logic circuit 59 is similar to the first branch and includes a blocking or time delay device 66 whose characteristic is different from that of the blocking device 61 in the first branch and whose output is connected with the setting input S of a memory 67 having an output A connected with a relay 68. The transducer 32b is connected with the inputs of the blocking devices 61, 66 as well as with the resetting input R of the memory 67. The output A of this memory is also connected to the other input of the OR gate 64.

The third branch of the logic circuit 59 in the evaluating circuit 31 comprises an inverter 69 whose input is connected with the transducer 32b and whose output is connected with the setting input S of a memory 71. The output of the inverter 69 is further connected with the input of a blocking or time delay device 72 whose output is connected to the resetting input R of the memory 71. The output A of the memory 71 is connected with the output A of the memory 67 as well as with the inverted input of the AND gate 46.

The transducer 29b is connected with a counter 73 which records the daily output of the structure shown in FIG. 1. An output of the counter 73 is connected with one of several inputs of a second counter 74 which can record and indicate the combined output of several transporting apparatus, for example, the combined output of apparatus which serve to deliver filter rod sections to a total of twenty filter tipping machines FTM in a manner as disclosed in the aforementioned commonly owned copending applications Ser. Nos. 228,966 and 230,417 of Günter Wahle et al. A third daily output counter is shown at 73a; this counter transmits signals to the corresponding input of the second counter 74. The counter 73a is intended to denote a second apparatus which is identical with or analogous to the apparatus of FIG. 1.

The operation of the structure which includes the evaluating circuit 31 of FIG. 3 is as follows:

If the sender 1 is turned on (rendered operative) by the device 47 (e.g., an electric switch) shown in the upper left-hand portion of FIG. 3 and the receiver 3 transmits a signal (in a manner as disclosed in the aforementioned commonly owned copending applications of Wahle et al.) denoting that the magazine MAG of the filter tipping machine FTM requires fresh filter rod sections 28 (the connection for transmission of such signal from a level monitoring device in the magazine MAG is indicated in FIG. 3 by the line 48a), the inverted inputs of the AND gates 44, 45 and 46 receive "low" signals (hereinafter called L-signals) which means that the gates 46, 45 and 44 transmit output signals because the device 48 is intended to denote the level detector in the magazine MAG of the filter tipping machine FTM. Consequently, both inputs of the AND gate 43 receive signals and the output of this AND gate transmits a signal to the blocking device 42 so that the latter assumes its inoperative position and allows filter rod sections 28 to leave the sender 1 for admission into the inlet of the conveyor 2 of FIGS. 1 and 2. The corresponding part of the sender 1 (such part is called a propelling unit in the aforementioned copending applications of Wahle et al.) propels filter rod sections 28 into the inlet of the pneumatic conveyor 2 and such sections move axially toward the speed uniformizing device 6 of the receiver 3. The blocking device 42 transmits a "high" signal (hereinafter called H-signal) to the corresponding input of the AND gate 38 in the first logic circuit 37 of the evaluating circuit 31. The transducer 29b of the monitoring device 29 transmits an impulse when the corresponding portion of the pneumatic conveyor 2 is still empty so that the output of the AND gate 38 transmits a signal to and starts the timer 39. The interval which is set by the timer 39 preferably corresponds to that which is required to advance a filter rod section 28 from the sender 1 into the range of the monitoring device 29. Thus, if the operation of the sender 1 is satisfactory, a filter rod section 28 must reach the monitoring device 29 (whereby the transducer 29b ceases to transmit an impulse to the left-hand input of the AND gate 38) prior to elapse of an interval which is set by starting the timer 39. Thus, the transducer 29b transmits a "low" impulse or signal (L-signal) as soon as a filter rod section 28 enters between the light source 29a and transducer 29b and the timer 39 is immediately reset to its original state before its output can transmit a "defect" signal (H-signal) to the relay 41 for actuation of the defect indicating signal generating device 36. When the trailing end of the foremost filter rod section 28 advances beyond the monitoring device 29, the transducer 29b again transmits an H-signal or impulse so that the AND gate 38 starts the timer 39 and the same procedure is repeated again, i.e., the output of the timer 39 does not transmit a signal to the relay 41 if the H-signal at the left-hand input of the AND gate 38 disappears prior to elapse of the interval which is selected by setting of the timer 39. The transducer 29b of the monitoring device 29 transmits a series of impulses and the duration of such impulses is monitored by the timer 39 to ascertain whether or not the intervals between arrivals of successive filter rod sections 28 into the range of the monitoring device 29 are not too long, i.e., not longer than the interval selected by setting of the timer 39.

If the monitoring device 29 fails to detect a filter rod section 28 within the interval which is selected by setting of the timer 39, the output of this timer transmits a signal to the relay 41 which is energized or deenergized (depending on its normal condition) to cause the device 36 to generate a "defect" signal. Such signal is noted by attendants and informs the attendants that the sender 1 fails to deliver filter rod sections 28 in spite of the fact that the starting device 47 for the sender is on, i.e., that the sender is supposed to be in operative condition. This leads the attendants to conclude that the sender 1 is defective. It will be noted that the provision of the first logic circuit 37 renders it possible to continuously monitor the operation of the sender 1 and to immediately ascertain whether or not the sender is in operative condition. Moreover, and since the device 36 generates a "defect" signal as soon as a single gap between successive filter rod sections 28 at the outlet of the sender 1 exceeds the preselected width, the defective operation of the sender can be detected and eliminated without delay.

It the monitoring device 32 detects the absence of filter rod sections 28 in the region immediately ahead of the accelerating device 7 in the housing 8 of the receiver 3, the right-hand input of the AND gate 49 in the second logic circuit 50 of the evaluating circuit 31 receives an H-signal because radiation issuing from the light source of the monitoring device 32 can reach the transducer 32b. If the output of the timer 39 in the first logic circuit 37 of the evaluating circuit 31 does not transmit a defect signal, the inverted left-hand input of the AND gate 49 does not receive a signal and the output of the gate 49 transmits a signal to the input of the timer 51. The interval which is set by the timer 51 is selected in such a way that the output of this timer transmits a signal to the relay 52 only when the monitoring device 32 fails to detect a filter rod section 28 for an excessive period of time. As a rule, the interval set by the timer 51 will be selected in such a way that it corresponds to the period of time required by a filter rod section 28 to advance from the sender 1 to the receiver 3. If no article 28 reaches the monitoring device 32 within such interval, the output of the timer 51 transmits a signal to the relay 52 which activates the defect signal generating device 34. The visible, audible and/or otherwise detectable signal which is furnished by the device 34 indicates to the attendants that the receiver 3 and/or the pneumatic conveyor 2 is defective. The signal at the output of the timer 51 is then an H-signal. The output of the timer 51 further transmits the H-signal to the inverted input of the AND gate 44 so that the output of the AND gate 43 ceases to transmit a signal to the blocking device 42 and the latter causes the sender 1 to interrupt the delivery of filter rod sections 28 into the pneumatic conveyor 2. It will be noted that the appearance of a defect signal which is generated by the device 34 denotes the interruption of delivery of filter rod sections 28 from the sender 1 into the pneumatic conveyor as well as the presence of a defect or malfunction in the conveyor 2 and/or receiver 3.

If the width of gaps G between the filter rod sections 28 in the space intermediate the devices 6 and 7 of the receiver 3 is less than that distance which would cause the output of the timer 51 to transmit a signal to the relay 52 in the second logic circuit 50 of the evaluating circuit 31, the absence of an impulse at the right-hand input of the AND gate 49 (as soon as the monitoring device 32 detects a filter rod section 28) entails erasure of the signal at the output of the gate 49 and the timer 51 is reset to zero. This means that the relay 52 does not activate the signal generating device 52 and the blocking device 42 remains in the inoperative position, i.e., the sender 1 continues to deliver filter rod sections 28 into the inlet of the pneumatic conveyor 2.

Each gap G between successive filter rod sections 28 in the housing 8 of the receiver 3 entails the generation of an H-signal or impulse by the monitoring device 32, and each such impulse causes the AND gate 49 to start the timer 51. Each article 28 which reaches the monitoring device 32 causes conversion of the H-signal or impulse at the output of the transducer 32a into an L-signal or impulse so that the timer 51 is reset to zero. When the operation of the transporting apparatus is satisfactory, such procedure is repeated again and again so that the transducer 32a furnishes a series of impulses and the length of intervals between successive impulses of such series is monitored by the timer 51 which generates a signal resulting in activation of the signal generating device 34 and blocking device 42 whenever the length of an interval exceeds the length of that interval which has been selected by setting of the timer 51. In other words, the first logic circuit 37 of the evaluating circuit 31 comprises means (timer 39) for ascertaining the length of intervals between successive impulses furnished by the transducer 29b, and the second logid circuit 50 of the evaluating circuit 31 comprises means (time 51) for ascertaining the length of intervals between successive impulses of the series of impulses generated by the transducer 32b. Also, whereas the first logic circuit 37 allows for immediate ascertainment of defects in the sender 1, the second logic circuit 50 allows for immediate ascertainment of defects in the pneumatic conveyor 2 and/or receiver 3.

The third logic circuit 53 of the evaluating circuit 31 monitors the length of the file of piled-up filter rod sections upstream of the receiver 3, i.e., in the outlet portion of the pneumatic conveyor 2. Thus, successive impulses of the series of impulses generated by the transducer 29b of the first monitoring device 29 are transmitted to and counted by the counter 54, and successive impulses generated by the transducer 32b of the second monitoring device 32 are transmitted to and counted by the counter 56. The outputs of the counters 54 and 56 transmit corresponding signals (denoting the sum of counted impulses) to the respective inputs of the differentiating circuit 57 whose output transmits a signal denoting the difference between the two numbers. If the number of filter rod sections 28 which are detected by the monitoring device 29 equals or is less than the number of sections 28 accepted by the receiver 3, this denotes that there is no pileup of sections at the downstream end of the conveyor 2. However, if the intensity or another characteristic of the signal which the counter 54 transmits to the differentiating circuit 57 exceeds the corresponding characteristic of the signal from the counter 56 to the circuit 57, the output of the signal comparing stage 58 transmits a signal to the inverted input of the AND gate 45 as soon as the stage 58 ascertains that the intensity of the difference signal transmitted by the circuit 57 exceeds a given reference value which can be selected by the attendants. If the difference is such that it denotes the presence of an excessive pileup upstream of the housing 8, the AND gate 45 ceases to transmit a signal to the AND gate 44 which ceases to transmit a signal to the blocking device 42 so that the latter interrupts the delivery of filter rod sections 28 from the sender 1 into the pneumatic conveyor 2. By appropriate selection of positions of the monitoring devices 29 (relative to the outlet of the sender 1) and 32 (relative to component parts of the receiver 3), as well as by appropriate setting of the source of reference signals in the signal comparing stage 58 in the third logic circuit 53 of the evaulating circuit 31, the attendants can select the size of the pileup at the downstream end of the pneumatic conveyor 2 practically at will.

The fourth logic circuit 59 of the evaluating circuit 31 renders it possible (owing to the aforediscussed positioning of the monitoring device 32 in the region of the accelerating device 7 in the receiver 3) to select the spacing between successive filter rod sections 28 in the receiver. The width of the gap G between two successive filter rod sections 28 in the region intermediate the devices 6 and 7 of the receiver 3 determines the duration of the H-signal or impulse which is supplied by the transducer 32b of the monitoring device 32. The transducer 32b transmits such impulse to the corresponding input of the OR gate 64 in the logic circuit 59 and the output of the OR gate applies the impulse to the resetting input R of the memory 62 in the first branch of the logic circuit 59. The input R is the dominant input of the memory 62. The output of the transducer 32b further transmits an H-signal or impulse to the input of the blocking device 61 whose time delay factor or constant $t_B$ is selected in such a way that it corresponds to the desired width of the gaps G, i.e., to the desired spacing between successive filter rod sections 28 advancing beyond the accelerating device 7 of the receiver 3.

Figure 4A:
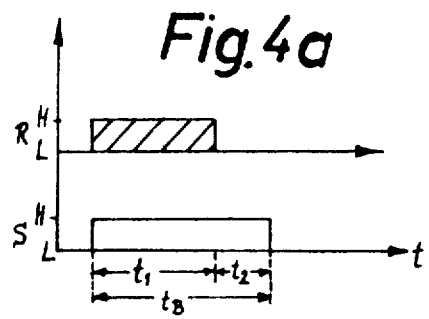
FIG. 4a is a diagram showing the mode of operation of certain parts of the evaluating means shown in FIG. 3.

In the diagram of FIG. 4a, time t is measured along the abscissas and the nature of signals applied to the inputs R and S of the memory 62 is indicated along the ordinate. The input R receives signals from the OR gate 64 and the input S receives signals from the blocking device 61. If the duration ($t_1$) of an H-signal or impulse at the output of the transducer 32b is less than the aforementioned constant $t_B$ of the blocking device 61, the resetting input R of the memory 62 receives from the transducer 32b (via OR gate 64) an L-signal or impulse during the balance ($t_2$) of the interval $t_B$ whereas the setting input S of the memory 62 continues to receive an H-signal since the interval $t_B$ selected by setting of the blocking device 61 is still running. This means that the output A of the memory 62 transmits an H-signal which energizes the relay 63 so that the latter actuates the ejecting device 33 for the purpose of ejecting from the path between the receiver 3 and the magazine MAG all such filter rod sections 28 which are too close to each other. This reduces or eliminates the likelihood of damage to neighboring sections 28 during a change in the direction of movement of the articles from axial movement to sidewise movement. Reference may be had to the aforementioned commonly owned patent to Rudszinat which shows a device for feeding filter rod sections into the magazine of a filter tipping or like machine by causing the filter rod sections to move sideways, i.e., at right angles (or substantially at right angles) to their respective axes.

If the duration of the H-signal or impulse which is transmitted by the transducer 32b equals or exceeds the constant $t_B$, the resetting input R of the memory 62 continues to receive an H-signal during the entire interval $t_B$ so that the output A of the memory 62 does not transmit a signal to the relay 63 and the ejecting device 33 remains inactive. This denotes that the spacing between successive filter rod sections 28 downstream of the device 6 in the housing 8 of the receiver 3 is satisfactory (or, at the least, not insufficient to allow for conversion of a file of such articles into a row wherein the articles move sideways). The relay 63 is an equivalent of the signal generating device 32 or 29, i.e., it generates a signal for activation of the ejecting device 33 when the series of impulses furnished by the transducer 32b deviates form a predetermined sequence.

The operation of the second branch of the logic circuit 59 is practically identical to that of the just discussed first branch. The only difference is that the time constant $t_B$ of the blocking device 66 is shorter than the constant selected by the setting of the blocking device 61 so that the second branch of the circuit 59 can detect gaps G which are too narrow for adequate ejection of sections 28 by the device 33. In such instances, the output A of the memory 67 transmits a signal to the relay 68 which arrests the device 48 to thus interrupt the operation of the accelerating device 7 in the receiver 3. The relay 68 also constitutes a signal generating device of the evaluating circuit 31.

The third branch of the logic circuit 59 in the evaluating circuit 31 determines the absence of gaps between successive filter rod sections 28. The inverter 69 in this third branch ensures that the setting input S of the memory 71 and the input of the blocking device 72 receive H-signals when the transducer 32b denotes the travel of a filter rod section therealong, i.e., when the output of the transducer 32b transmits an L-signal or impulse. The time constant $t_B$ of the blocking device 72 is selected in such a way that it corresponds to the length of an article 28 travelling past the transducer 32b (refer to the lower abscissa in the diagram of FIG. 4b). This means that, when the transducer 32b transmits an L-signal or impulse, the inverter 69 causes the blocking device 72 to receive an H-signal and such signal is transmitted to the dominant resetting input R of the memory 71 during the full interval $t_B$. If the duration of the H-signal or impulse which is generated by the transducer 32b is shorter (see $t_1$ in FIG. 4b) than $t_B$, the output A of the memory 71 transmits an L-signal. If the duration of the H-signal or impulse exceeds $t_B$ (note the upper abscissa in the diagram of FIG. 4b), the output A of the memory 71 transmits (during the interval $t_3$) a defect signal which causes the AND gate 46 to activate the blocking device 42 via AND gates 45, 44 and 43 so that the sender 1 ceases to deliver filter rod sections 28 into the inlet of the pneumatic conveyor 2. Thus, the memory 71 is an equivalent of the signal generating device 34, 36, 63 or 68.

It will be noted that the fourth logic circuit 59 of the evaluating circuit 31 can distinguish between different gaps G and can ascertain the absence of such gaps. This ensures that the causes of potential defects or malfunctions can be ascertained even before they develop and certainly before they could adversely influence the operation of the improved transporting apparatus.

It will be noted that the timer 39 of the first logic circuit 37 in the evaluating circuit 31 ascertains the duration of impulses which are transmitted by the transducer 29b of the monitoring device 29, i.e., the timer 39 compares each such impulse with a predetermined value and causes the relay 41 to initiate the generation of a defect signal when the impulses are too long. However, it is equally within the purview of the invention to monitor or ascertain certain other characteristics of impulses which are generated by the transducer 29b.

An advantage of placing the monitoring device 29 in immediate proximity of the outlet 1a of the sender 1 is that this device can immediately detect eventual malfunctioning of the sender 1 and causes the evaluating circuit 31 (i.e., the signal generating device 36) to generate a signal which enables the attendants to rapidly locate and eliminate the cause of malfunction. The timer 39 can detect the presence of acceptable impulses which are generated by the transducer 29b, the absence of any impulses at the output of the transducer 29b, as well as deviations of the series of impulses supplied by the transducer 29b from a predetermined or optimum sequence.

The provision of the second monitoring device 32 further reduces the likelihood of improper operation of the apparatus and/or the likelihood of prolonged malfunctioning of certain components of the apparatus, especially of the components which constitute or are combined with the receiver 3 and/or pneumatic conveyor 2. The manner in which impulses appearing at the output of the transducer 32b are treated in the logic circuit 50 of the evaluating circuit 31 is analogous to the treatment of impulses of the first series (from the transducer 29b) in the logic circuit 37. Thus, the timer 51 can detect the presence or absence of impulses of the second series as well as whether or not the second series of impulses deviates from a predetermined sequence. The signal generating device 34 enables the attendants to rapidly localize the malfunction, i.e., an attendant who notes a signal at 34 knows that the defect is attributable to a part in the conveyor 2 and/or in the receiver 3.

The advantages of the signal transmitting connection between the output of the timer 39 in the logic circuit 37 and the inverted input of the AND gate 49 in the logic circuit 50 have been pointed out hereinabove, i.e., the signal generating device 34 can generate a defect signal only when the signal generating device 36 is off. More specifically, the signal at 34 cannot indicate a defect in the sender 1, and a signal at 36 need not indicate the presence of a defect in the conveyor 2 and/or receiver 3.

The logic circuit 53 of the evaluating circuit 31 continuously monitors the supply of filter rod sections 28 in the pneumatic conveyor 2 and prevents excessive pileups of sections at the outlet of the conveyor. If the number of sections 28 is too low, the logic circuit 53 causes the signal generating device 34 to inform the attendants accordingly. If the absence of a sufficient number of sections 28 in the conveyor 2 is attributable to malfunction of the sender 1, the signal is generated by the logic circuit 37 via device 36.

The logic circuit 59 of the evaluating circuit 31 renders it possible to ascertain potential causes of defects (namely, potential breakage or deformation of filter rod sections 28 preparatory to entry into the magazine MAG) even before the defects develop. Thus, the circuit 59 can ascertain the absence of sufficient gaps between successive sections 28 ahead of the direction or orientation changing means in the receiver 3 so that remedial steps can be undertaken (e.g., by ejecting the sections 28 which are too close to each other) before the sections which are too close to each other can clog the receiver 3.

Figure 4B:
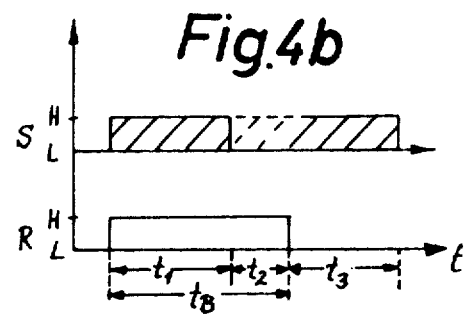
FIG. 4b is a similar diagram of the mode of operation of certain other parts in the evaluating means of FIG. 3.

As shown in FIG. 4b, the logic circuit 59 is further capable of monitoring the length of filter rod sections 28. This is done in connection with determination whether or not there exist any gaps at all. This, too, ensures that potential malfunctions can be detected before they actually occur. Thus, one can avoid jamming of the orientation changing device which follows the accelerating device 7 and feeds one or more rows of sections 28 into the magazine MAG.

A further important advantage of the improved apparatus is its relative simplicity and versatility. Moreover, the evaluating circuit 31 and the monitoring devices 29, 32 can be installed in or combined with many existing transporting apparatus without necessitating substantial and costly alterations of such apparatus. Defects or potential defects are detected pratically without delay so that the number of down times of an apparatus which embodies the present invention is a small fraction of down times in conventional apparatus. Also, the duration of each down time can be held to a minimum. The optional features, such as the counters 73, 73a and 74, also contribute to versatility of the apparatus and simplify the task of the attendants. The same holds true for the feature that the evaluating circuit 31 automatically monitors the pileup of sections 28 at the outlet of the pneumatic conveyor 2.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. Apparatus for transporting rod-shaped articles which constitute or form part of smokers' products, comprising a pneumatic conveyor having an inlet and an outlet; a sender operable to deliver a succession of rod-shaped articles into the inlet of said conveyor; a receiver adjacent to said outlet and operable to accept successive articles from said conveyor; a monitoring device adjacent to said sender and including means for generating a series of impulses in response to travel of successive articles in said conveyor so that said series of impulses is indicative of the presence, absence and rate of delivery of articles from said sender to said inlet; and means for evaluating said series of impulses, including signal generating means activatable to transmit signals in the absence and/or on deviation of said series of impulses from a predetermined sequence.

2. The apparatus of claim 1, wherein said evaluating means includes a circuit and said signals include defect signals.

3. The apparatus of claim 1, wherein said evaluating means further includes a unit having means for ascertaining the presence or absence of impulses as well as the duration of each impulse in the operative condition of said sender and for activating said signal generating means in the absence of an impulse as well as when the duration of an impulse deviates from a predetermined value.

4. The apparatus of claim 3, wherein said unit includes a logic circuit and said means for ascertaining includes a resettable timer in said logic circuit.

5. The apparatus of claim 3, wherein said means for generating said series of impulses comprises a detector arranged to generate impulses in the absence of articles in the adjacent portion of said conveyor so that each of said impulses is indicative of the width of the gap between successive articles which said sender admits into said inlet.

6. The apparatus of claim 1, wherein said receiver includes an accelerating device for successive articles leaving said outlet and further comprising a second monitoring device adjacent to said accelerating device and including means for generating a second series of impulses in response to travel of successive articles through said receiver so that said second series of impulses is indicative of the presence, absence and rate of travel of articles through said receiver, said evaluating means being connected with said second monitoring device and said signal generating means of said evaluating means being activatable to transmit signals in the absence and/or on deviation of said second series of impulses from a predetermined sequence.

7. The apparatus of claim 6, wherein said evaluating means further comprises a unit having means for ascertaining the presence or absence of impulses of said second series as well as the duration of each impulse of said second series in the operative condition of said sender and for activating said signal generating means in the absence of an impulse of said second series as well as when the duration of an impulse of said second series deviates from a predetermined value.

8. The apparatus of claim 7, wherein said unit includes a logic circuit and said means for ascertaining includes a resettable timer in said logic circuit.

9. The apparatus of claim 6, wherein said receiver further comprises a speed uniformizing device disposed between said outlet and said accelerating device, said accelerating device having first and second sides respectively nearer to and more distant from said uniformizing device, as considered in the direction of travel of articles through said receiver, and said second monitoring device being adjacent to the path of articles at one of said sides.

10. The apparatus of claim 7, wherein said evaluating means further comprises a second unit having means for ascertaining the presence or absence of impulses of said first mentioned series as well as the duration of each impulse of said first mentioned series in the operative condition of said sender and for activating said signal generating means in the absence of an impulse of said first mentioned series as well as when the duration of an impulse of said first mentioned series deviates from a predetermined value, said ascertaining means of said second unit including means for transmitting to said first mentioned unit a signal in response to activation of said signal generating means by way of said second unit, said ascertaining means of said first mentioned unit being operable to activate said signal generating means only in the absence of a signal from the ascertaining means of said second unit.

11. The apparatus of claim 10, wherein each of said units comprises a logic circuit and said means for generating said second series of impulses comprises a detector arranged to generate the impulses of said second series in the absence of articles in the adjacent portion of the path of articles downstream of said conveyor so that each impulse of said second series is indicative of the width of the gap between successive articles which advance past said second monitoring device.

12. The apparatus of claim 1, wherein said receiver includes an accelerating device for successive articles leaving said outlet and further comprising a second monitoring device adjacent to said accelerating device and including means for generating a second series of impulses in response to travel of successive articles through said receiver so that such second series of impulses is indicative of the presence, absence and rate of travel of articles through said receiver, said evaluating means further comprising a unit having means for comparing said first mentioned and said second series of impulses and for activating said signal generating means when the comparing means ascertains a predetermined difference between said first mentioned and said second series of impulses.

13. The apparatus of claim 12, wherein said unit includes a logic circuit and said logic circuit further comprises first and second counter means respectively connected with said first mentioned and said second monitoring devices and each having means for counting the number of impulses in the respective series as well as an output for transmission of signals denoting the counted number of the respective impulses, said comparing means including a differentiating device which receives signals from said counters and is arranged to transmit a further signal denoting the difference between the numbers of counted signals of said first mentioned and said second series, and a signal comparing stage arranged to compare said further signal with a reference signal and to activate said signal generating means when said further signal deviates from said reference signal to a predetermined extent.

14. The apparatus of claim 1, wherein said receiver includes an accelerating device for successive articles leaving said outlet and further comprising a second monitoring device adjacent to said accelerating device and including means for generating a second series of impulses in response to travel of successive articles through said receiver so that such second series of impulses is indicative of the presence, absence and rate of travel of articles through said receiver, said evaluating means further comprising a unit having means for comparing said second series of impulses with a predetermined sequence and for activating said signal generating means when the comparison indicates that the width of gaps between successive articles moving past said second monitoring device deviates from a predetermined range of widths.

15. The apparatus of claim 14, wherein said comparing means includes means for activating said signal generating means when the width of said gaps is less than a predetermined width.

16. The apparatus of claim 14, wherein said comparing means comprises at least one blocking device having an input connected with said second monitoring device and an output and being arranged to delay the transmission of an impulse from said input to said output thereof for a predetermined interval of time, and a memory having a setting input connected with said output, a resetting input connected with said second monitoring device and an output arranged to activate said signal generating means in the presence of an impulse at said setting input while said resetting input fails to receive an impulse from said second monitoring device.

17. The apparatus of claim 14, further comprising an ejecting device for articles, said ejecting device being adjacent to the path of articles in said receiver and said signal generating means including means for actuating said ejecting device in response to activation of said signal generating means by said comparing means.

18. The apparatus of claim 17, wherein said accelerating device having a side nearer to and a side more distance from the outlet of said conveyor, said ejecting device being adjacent to one of said sides.

19. The apparatus of claim 17, wherein said ejecting device comprises means for expelling articles from said path by means of a gaseous fluid.

20. The apparatus of claim 14, wherein said unit includes a logic circuit and said logic circuit comprises a blocking device having an input connected with said second monitoring device and an output and being arranged to delay the transmission of an impulse from said input to said output for a predetermined interval of time, an inverter in the connection between said input and said second monitoring device, and a memory having a setting input connected with said inverter, a resetting input connected with the output of said blocking device and an output arranged to activate said signal generating means in the presence of an impulse at said setting input while said resetting input fails to receive an impulse.

21. The apparatus of claim 1, wherein said impulse generating means of said monitoring device comprises a photoelectronic transducer.

22. The apparatus of claim 1, wherein said receiver includes an accelerating device for successive articles leaving said outlet and further comprising a second monitoring device adjacent to said accelerating device and connected with said evaluating means, said second monitoring device including means for generating a second series of impulses in response to travel of successive articles through said receiver so that said second series of impulses is indicative of the presence, absence and rate of travel of articles through said receiver, at least one of said means for generating impulses including a photoelectronic transducer.

23. The apparatus of claim 1, further comprising a counter connected with said monitoring device and operative to count the total number of impulses generated within a given period of time, particularly within a full day of operation of said sender.

24. The apparatus of claim 23, further comprising a second counter having a plurality of inputs one of which is connected with said first named counter, and further comprising a third counter corresponding to said first named counter and connected with another input of said second counter, said second counter having means for totalizing the numbers of impulses denoted by signals transmitted thereto by said first named and said third counters.

* * * * *